United States Patent
Majdabadi et al.

(10) Patent No.: US 11,501,362 B2
(45) Date of Patent: Nov. 15, 2022

(54) DATA-DRIVEN BASED ONLINE-LOCAL STORE MATCH

(71) Applicant: International Business Machines Corporation, Armonk, NY (US)

(72) Inventors: Hamid Majdabadi, Ottawa (CA); Ravithej Chikkala, Pflugerville, TX (US); Zachary A. Silverstein, Jacksonville, FL (US); Su Liu, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/875,800

(22) Filed: May 15, 2020

(65) Prior Publication Data
US 2021/0358019 A1 Nov. 18, 2021

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0639* (2013.01); *G06Q 30/0239* (2013.01); *G06Q 30/0629* (2013.01); *G06Q 30/0643* (2013.01)

(58) Field of Classification Search
None
See application file for complete search history.

(56) References Cited

U.S. PATENT DOCUMENTS

| | | | | |
|---|---|---|---|---|
| 6,249,772 B1 * | 6/2001 | Walker | ........ | G06Q 20/00 705/26.41 |
| 7,860,753 B2 * | 12/2010 | Walker | ........ | G06Q 20/00 705/26.1 |
| 9,959,562 B1 * | 5/2018 | Ackerman | ........ | G06Q 30/0631 |

(Continued)

FOREIGN PATENT DOCUMENTS

| | | |
|---|---|---|
| WO | 2000079495 | 12/2000 |
| WO | 2006011847 | 2/2006 |

OTHER PUBLICATIONS

Zheng Qin, "Introduction to E-commerce", 2009, Springer, springer. com (Year: 2009).*

(Continued)

*Primary Examiner* — Michelle T Kringen
*Assistant Examiner* — Norman Donald Sutch, Jr.
(74) *Attorney, Agent, or Firm* — Caleb D. Wilkes

(57) ABSTRACT

An online store offering a product that is currently unavailable can still fulfill an order for the product by querying a multi-store inventory database to see if the product is available from brick-and-mortar stores near the customer. Proximity of local stores is based on a customer location in the customer's profile. Local store selection can be based on product matching policies such as a threshold price difference for the product compared to the online store price. If the customer approves local store pickup, the service generates a voucher to purchase the product directly from the local stores, and presents it to the customer via the online presence. The customer can then redeem the voucher at any of the indicated local stores and pick up the product. When the system receives confirmation of redemption of the voucher, a credit is issued from the online store to the local store.

20 Claims, 5 Drawing Sheets

(56) References Cited

U.S. PATENT DOCUMENTS

| | | | | |
|---|---|---|---|---|
| 10,289,612 | B2* | 5/2019 | Knobel | G06K 19/06009 |
| 2005/0097005 | A1* | 5/2005 | Fargo | G06Q 30/0625 |
| | | | | 705/26.62 |
| 2008/0275768 | A1* | 11/2008 | Berman | G06Q 30/00 |
| | | | | 705/14.39 |
| 2011/0282724 | A1* | 11/2011 | Hwang | G06Q 30/0217 |
| | | | | 705/14.19 |
| 2012/0265561 | A1 | 10/2012 | Patro | |
| 2012/0323658 | A1 | 12/2012 | Zhou et al. | |
| 2014/0040071 | A1* | 2/2014 | Raman | G06Q 30/0613 |
| | | | | 705/26.41 |
| 2014/0337134 | A1 | 11/2014 | Bugenhagen | |
| 2016/0350842 | A1* | 12/2016 | Glass | G11B 27/031 |
| 2020/0043077 | A1* | 2/2020 | Turner | G06Q 30/0601 |
| 2020/0357040 | A1* | 11/2020 | Patel | G06Q 30/0635 |

OTHER PUBLICATIONS

PR Newswire; "Trimble Announces Trimble Exchange, an e-Commerce Platform for Pre-Owned Trimble Products: Purchase Used, Refurbished and Legacy Trimble Construction Products Online from a Trusted Local Source"; Feb. 14, 2019; PR Newswire Association LLC; (Year: 2019).*

Amazon, "Prime Now" [online], retrieved on May 15, 2020 from the Internet URL: https://primenow.amazon.com (2019).

Groupon, "Online Shopping Deals and Coupons" [online], retrieved on May 15, 2020 from the Internet URL: https://www.groupon.com/ (2019).

IBM, "A Method for Location-Based Comparison Shopping from the Click-and-Brick Stores", ip.com, IP.com No. IPCOM000014866D (2001).

Intuit Mint, "Manage All Accounts in One Place" [online], retrieved on May 15, 2020 from the Internet URL: https://www.mint.com/ (2019).

* cited by examiner

DATA-DRIVEN BASED ONLINE-LOCAL STORE MATCH

BACKGROUND OF THE INVENTION

Field of the Invention

The present invention generally relates to electronic commerce, and more particularly to a method of order fulfillment for orders placed with an online store.

Description of the Related Art

The Internet has introduced many changes for consumer spending, chief among these being online shopping, sometimes referred to as eCommerce. Online shopping is a form of electronic commerce which allows consumers to buy goods or services from a seller over the Internet using a web browser, as opposed to shopping at a physical store presence, i.e., a "brick-and-mortar" retailer.

Currently customers can shop online using a range of different computers and devices, including desktop computers, laptops, tablet computers, smartphones, and smart speakers. In one scenario, consumers find a product of interest by visiting the website of the retailer or by searching among alternative vendors using a shopping search engine, which displays the same product's availability and pricing at different e-retailers. Once a particular product has been found on the website of the seller, online retailers use "shopping cart" software to allow the consumer to accumulate multiple items and to adjust quantities, similar to filling a physical shopping cart or basket in a conventional store. A checkout process follows (continuing the physical-store analogy) in which payment and delivery information is collected. Financial transactions are processed in real-time. Items purchased online are shipped from stores or warehouses directly to the purchaser's home or place of business. Alternatively, items purchased online can be picked up at a physical store of the online retailer.

As with brick-and-mortar stores, online businesses are always trying to find better ways to optimize costs while keep their customers happy. Some of the more common schemes include things like preferred days (or times) of delivery, free delivery, special sales promotions that might be seen at brick-and-mortar stores such as "buy one, get one free", price discounts such as a store credit for spending a minimum amount online, and electronic coupons.

SUMMARY OF THE INVENTION

The present invention in at least one embodiment is generally directed to a method of enhancing online shopping by receiving an inquiry from a user via an online presence of an online store for a product offered by the online store, ascertaining that the product is unavailable from the online store, querying a multi-store inventory database to determine that the product is available from at least one particular physical store local to the user wherein the particular physical store is separate from the online store, making an offer of the product available at the particular physical store to the user via the online presence of the online store, receiving approval of the offer from the user, and presenting a voucher to the user via the online presence of the online store for purchasing the product directly from the particular physical store. The particular physical store can be established as local to the user based on a predefined proximity of the particular physical store to the user location according to a profile of the user. Local store selection can also be based in part on product matching policies such as a threshold price difference for the product from the particular physical store compared to the online store. When the system receives confirmation of redemption of the voucher from the particular physical store, a credit is issued from the online store to the particular physical store for purchase of the product. In an exemplary implementation the system includes: an online-local store match manager that maintains user profiles for a plurality of users including the user, store profiles for a plurality of physical stores including the particular physical store, a data structure having a plurality of parameters relating to matching of an online selected product with the physical stores, and a set of product matching policies establishing constraints on when the online selected product matches one or more of the physical stores; an online-local store match analyzer that maintains the multi-store inventory database based on current product availability at the physical stores; an online-local store match monitor that monitors online shopping activities of the users and identifies candidate products from the physical stores that match the online selected product; and an online-local store match validator that creates a transaction record for the voucher, generates the voucher, authenticates the redemption of the voucher, and instructs the credit.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

DESCRIPTION OF THE PREFERRED EMBODIMENT(S)

Online stores have several advantages over brick-and-mortar retailers but they can still suffer similar problems with maintaining sufficient inventory levels. For example, it can be harder for online stores to offer fresh or perishable goods due to warehousing requirements as well as delivery methods. In certain situations, e-commerce brokers might be out of stock of an item or a given model. This circumstance can often be annoying to a customer as they can only "be notified" when (or if) the product comes back in stock. Conversely, local retailers can provide fresher products with more flexible pick up and/or delivering methods, but they may not be able to advertise themselves very well and may not have efficient transaction supports and customer services compared to the online stores.

It would, therefore, be desirable to devise an improved method of automated e-commerce that can allow an online store to more easily fulfill an order for a product that is currently out of stock or otherwise unavailable (e.g., a perishable item that cannot be timely delivered by the online store). It would be further advantageous if the method could leverage resources of local stores through a collaboration with major online retailers that did not require contracts or other extensive agreements. These and other advantages are achieved in various implementations of the present invention by taking an online order for a product that is unavailable at the online store and querying one or more physical stores that are local to the particular customer making the order according to real-time commercial data analytics to see if they have the product available. The online store can effectively offer the local product utilizing its own e-commerce hub to facilitate the transaction. If the customer assents to this arrangement, the online store can generate a voucher or certificate which the customer uses at the local store to immediately pick up the product. The customer can printout the certificate or just store an image of it on their personal mobile computing devices such as a smartphone to present it to the local store. Once redeemed, the online store can issue a credit to the local store for the customer's purchase of the product.

Figure 1:
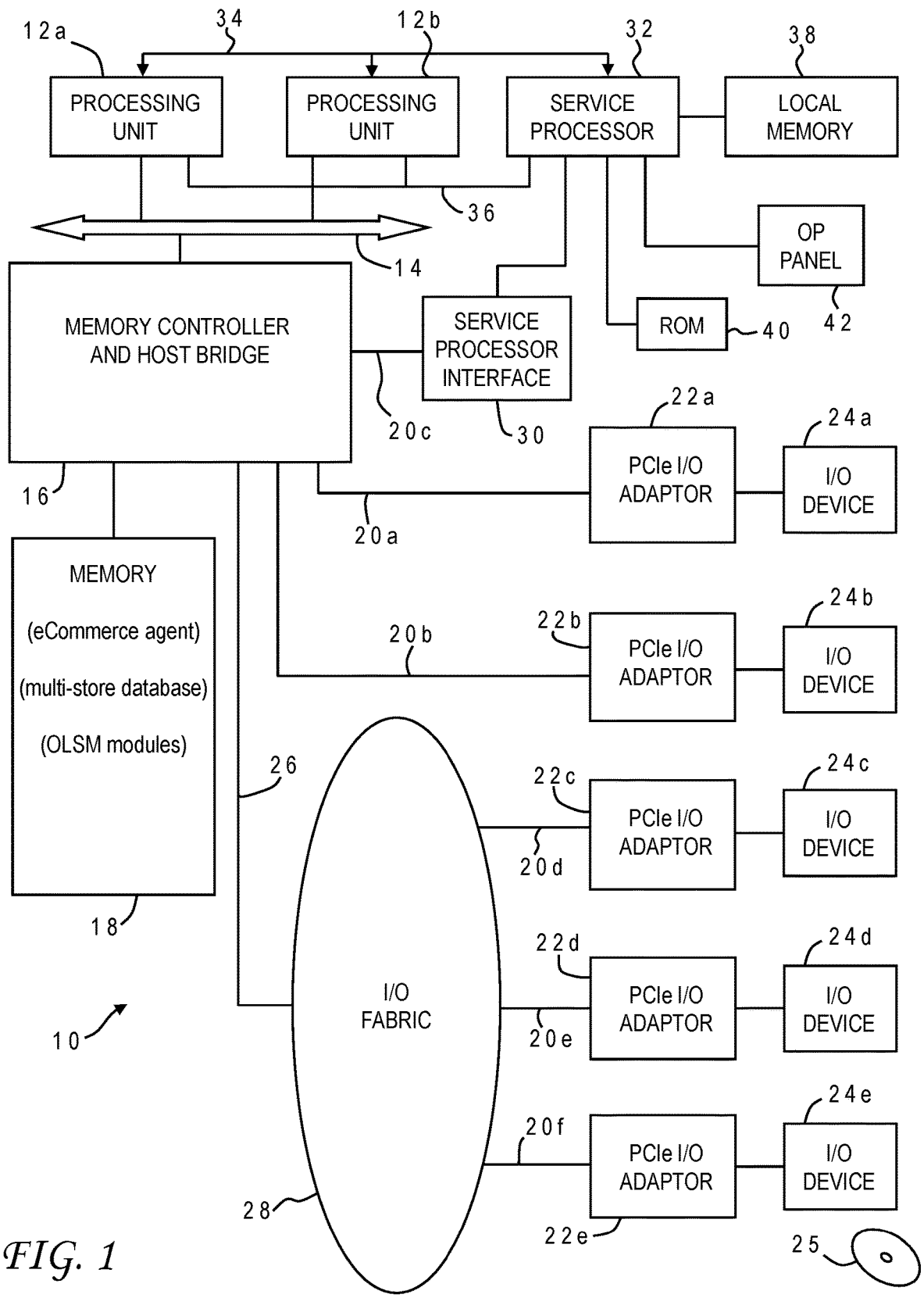
FIG. 1 is a block diagram of a computer system programmed to carry out online-local store matching in accordance with one implementation of the present invention.

With reference now to the figures, and in particular with reference to FIG. 1, there is depicted one embodiment 10 of a computer system in which the present invention may be implemented to carry out online-local store matching. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein one or more applications or databases in accordance with the present invention, such as an e-commerce agent, a multi-store database of products available at physical (brick-and-mortar) stores, and the online-local store match (OLSM) modules discussed further below in conjunction with FIG. 3.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the online-local store matching application of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

The present invention may be a system, a method, and/or a computer program product. The computer program product may include one or more computer readable storage media collectively having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for an online-local store matching process that uses novel analytic techniques to manage online order fulfillment. Accordingly, a program embodying the invention may additionally include conventional aspects of various online shopping (e-commerce) tools, and these details will become apparent to those skilled in the art upon reference to this disclosure.

In some embodiments, one or more aspects of the present invention may be carried out using cloud computing. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include various characteristics, service models, and deployment models.

Characteristics can include, without limitation, on-demand service, broad network access, resource pooling, rapid elasticity, and measured service. On-demand self-service refers to the ability of a cloud consumer to unilaterally provision computing capabilities, such as server time and network storage, as needed automatically without requiring human interaction with the service's provider. Broad network access refers to capabilities available over a network and accessed through standard mechanisms that promote use by heterogeneous thin or thick client platforms (e.g., mobile phones, laptops, and personal digital assistants, etc.). Resource pooling occurs when the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity means that capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service is the ability of a cloud system to automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models can include, without limitation, software as a service, platform as a service, and infrastructure as a service. Software as a service (SaaS) refers to the capability provided to the consumer to use the provider's applications running on a cloud infrastructure. The applications are accessible from various client devices through a thin client interface such as a web browser. The consumer does not manage or control the underlying cloud infrastructure including network, servers, operating systems, storage, or even individual application capabilities, with the possible exception of limited user-specific application configuration settings. Platform as a service (PaaS) refers to the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a service (IaaS) refers to the capability provided to the consumer to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models can include, without limitation, private cloud, community cloud, public cloud, and hybrid cloud. Private cloud refers to the cloud infrastructure being operated solely for an organization. It may be managed by the organization or a third party and may exist on-premises or off-premises. A community cloud has a cloud infrastructure that is shared by several organizations and supports a specific community that has shared concerns (e.g., mission, security requirements, policy, and compliance considerations). It may be managed by the organizations or a third party and may exist on-premises or off-premises. In a public cloud, the cloud infrastructure is made available to the general public or a large industry group and is owned by an organization selling cloud services. The cloud infrastructure for a hybrid cloud is a composition of two or more clouds (private, community, or public) that remain unique entities but are bound together by standardized or proprietary technology that enables data and application portability (e.g., cloud bursting for load-balancing between clouds).

Figure 2:
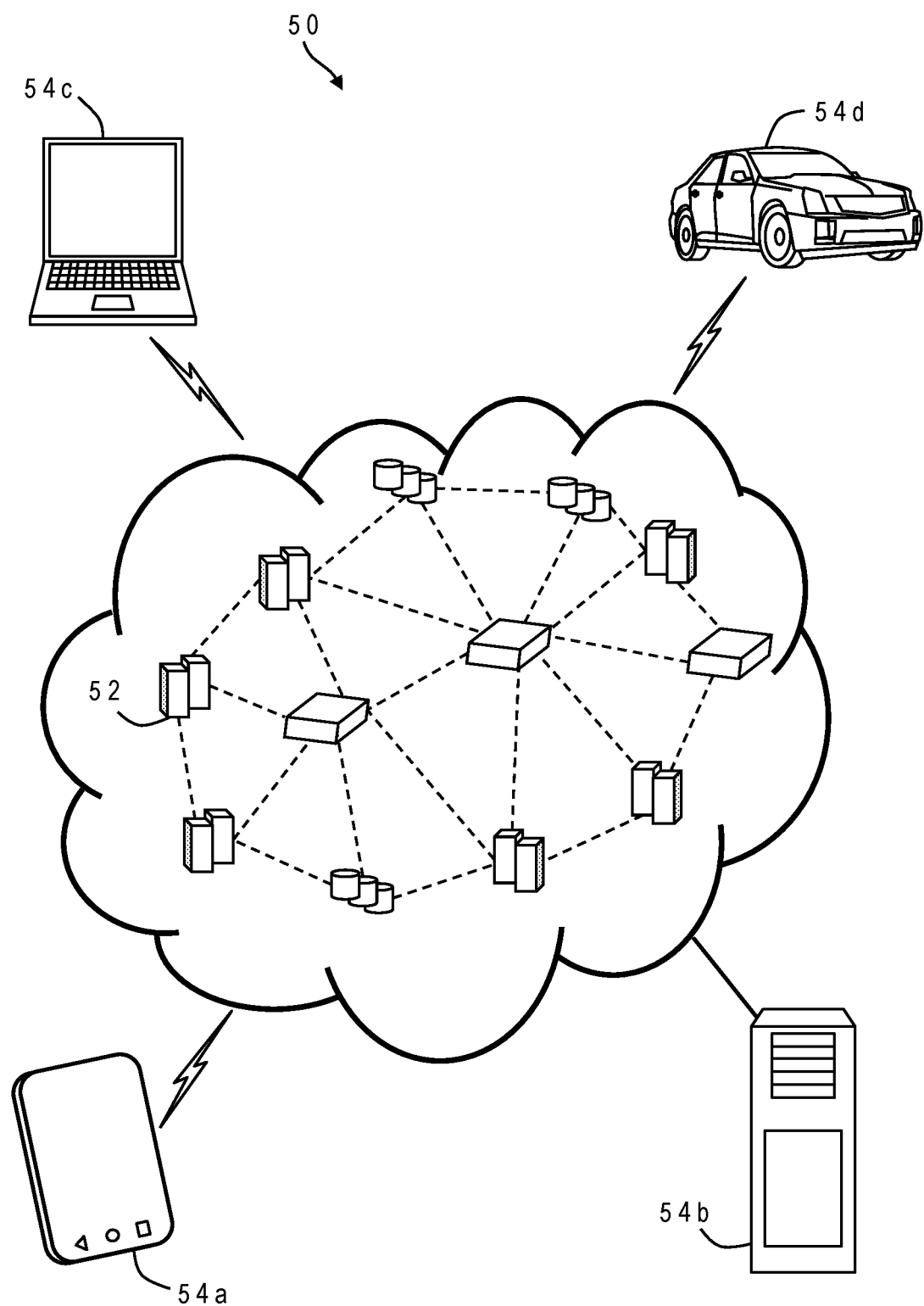
FIG. 2 is a pictorial representation of a cloud computing environment in accordance with one implementation of the present invention.

A cloud computing environment is service oriented with a focus on statelessness, low coupling, modularity, and semantic interoperability. At the heart of cloud computing is an infrastructure that includes a network of interconnected nodes. An illustrative cloud computing environment 50 is depicted in FIG. 2. As shown, cloud computing environment 50 includes one or more cloud computing nodes 52 with which local computing devices used by cloud consumers, such as, for example, personal digital assistant (PDA) or cellular telephone 54a, desktop computer 54b, laptop computer 54c, and/or automobile computer system 54d may communicate. Nodes 52 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54a-54d shown in FIG. 2 are intended to be illustrative only and that computing nodes 52 and cloud computing environment 50 can communicate with any type of computerized device over any type of network and/or network addressable connection (e.g., using a web browser).

Figure 3:
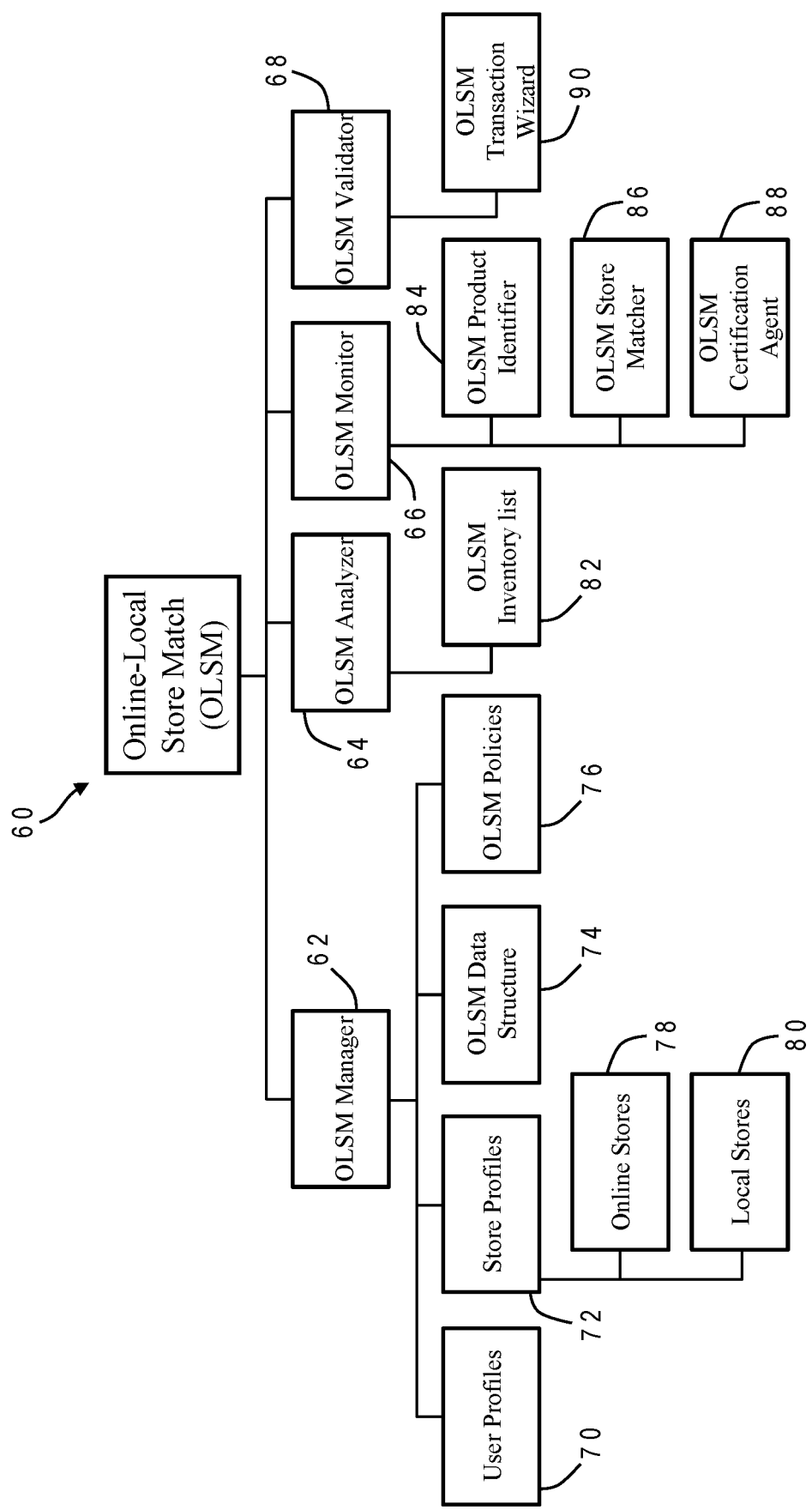
FIG. 3 is a block diagram of an online-local matching system in accordance with one implementation of the present invention.

In the illustrative implementation, certain aspects of the present invention can be carried out by a cloud server. The cloud server may for example be a node 52 of FIG. 2 having an architecture like computer system 10 of FIG. 1 that communicates with e-commerce sites, local stores and consumers via the Internet. The cloud server uses various data analytics to create a real-time and dynamic sales authorization pickup voucher redeemable at a physical store near a customer facilitated by an online store's e-commerce hub. This process can be performed by an online-local store match (OLSM) system running on the cloud server. FIG. 3 shows such an OLSM system 60 in accordance with one embodiment of the present invention which is used to enhance the online shopping experience. OLSM system 60 has several software modules including an OLSM manager 62, an OLSM analyzer 64, an OLSM monitor 66, and an OLSM validator 68.

OLSM manager 62 configures the system to define an OLSM framework that relies on user profiles 70, store profiles 72, an OLSM data structure 74, and OLSM policies 76. User profiles 70 are comprised of multiple records uniquely associated with respective customers. A given user profile can have extensive information for the particular user pertaining to e-commerce shopping habits as well as personal information such as demographic data and at least one physical address or other geographic location associated with the user, e.g., their home or workspace. Store profiles 72 include information for both online stores 78 and local stores 80. An online store can be connected to a third party facilitator that manages local store profiles and inventory. An online store is thus a gateway to the third party platform holding all local store information and profiles to match with the suitable online vendor when an item is searched in any participating vendor's store. So, the online store becomes a commerce hub for a trusted transaction while also acting as a store front through the third party platform that manages the local store profiles. The online store retains a store ID and a transaction ID that gets matched and sent back to the third party after each phase is completed (pick-up authorization issuance, pre-authorized payment verification and final local vendor reimbursement). A local store profile contains a physical address or other geographic location for a given local store. Local stores are identified through a unique ID passed on through the third party.

OLSM data structure 74 defines various OLSM-related parameters to match a product selected online to one or more local stores. In the illustrative implementation the OLSM-related parameters include: a user identification number (ID) unique to each customer; a purchase ID unique to each online shopping transaction; a product ID unique to each product (such as a universal product code or UPC); an online store ID unique to each online store; an online price of a product as offered by an online store; a local store ID unique to each local store; a local price of a product as offered by a local store; and a matched local store list which correlates each matched local store ID with the selected product ID and local price of the selected product. OLSM policies 76 define a set of product matching policies used in making the determination of whether a product offered by a local store qualifies for the voucher program. For example, one product matching policy could be a requirement that the local store price for the product is no more than 5% different from the online store's price. So the consumer may have to pay a little extra if they wish to procure the item locally, or the online store can absorb the cost difference and still offer the local-sourced product at the same online price.

OLSM analyzer 64 collects and analyzes e-commerce data pertaining to the local stores, available products and pricing. This data can be provided by collaborative software deployed at the local stores and/or through third parties such as web-based personal financial management services or credit records. OLSM analyzer 64 uses this data to create and periodically update an OLSM inventory list 82.

OLSM monitor 66 monitors a user's online shopping activities. This monitoring results in an OLSM product identifier 84 that identifies a particular product selected by the user. An OLSM store matcher 86 can find one or more local stores that are physically proximate the user's location (based on the local store profiles and the user's profile) and that carry the selected product. Proximity can be based on a variety of factors. In the simplest implementation a physical store is considered sufficiently proximate if it is within a predefined distance (e.g., 10 miles) of the user's location. OLSM store matcher 86 can also take into consideration any preferences/constraints from OLSM policies 76.

The online store is responsible for completing the transaction using the user's general profile and payment method already set up for their online shopping. The online store assigns a payment to the unique ID, and issues a digital local pickup order or voucher. An OLSM certification agent 88 generates the voucher matched to the local store(s). A single voucher can be made redeemable at more than one local store. When the digital authorization is scanned by the local retailer, it notifies the online store that the transaction is completed, and voucher is redeemed. The buyer's pending payment is completed to a final transaction and payment is sent to the local vendor's account through the third party managing the local stores. OLSM validator 68 confirms when the selected product has been picked up from one of the local stores using the purchased voucher, i.e., redemption of the voucher by the user. An OLSM transaction wizard 90 responsively instructs the transfer of money or other credit to the local store from the user's account with the online store.

Figure 4:
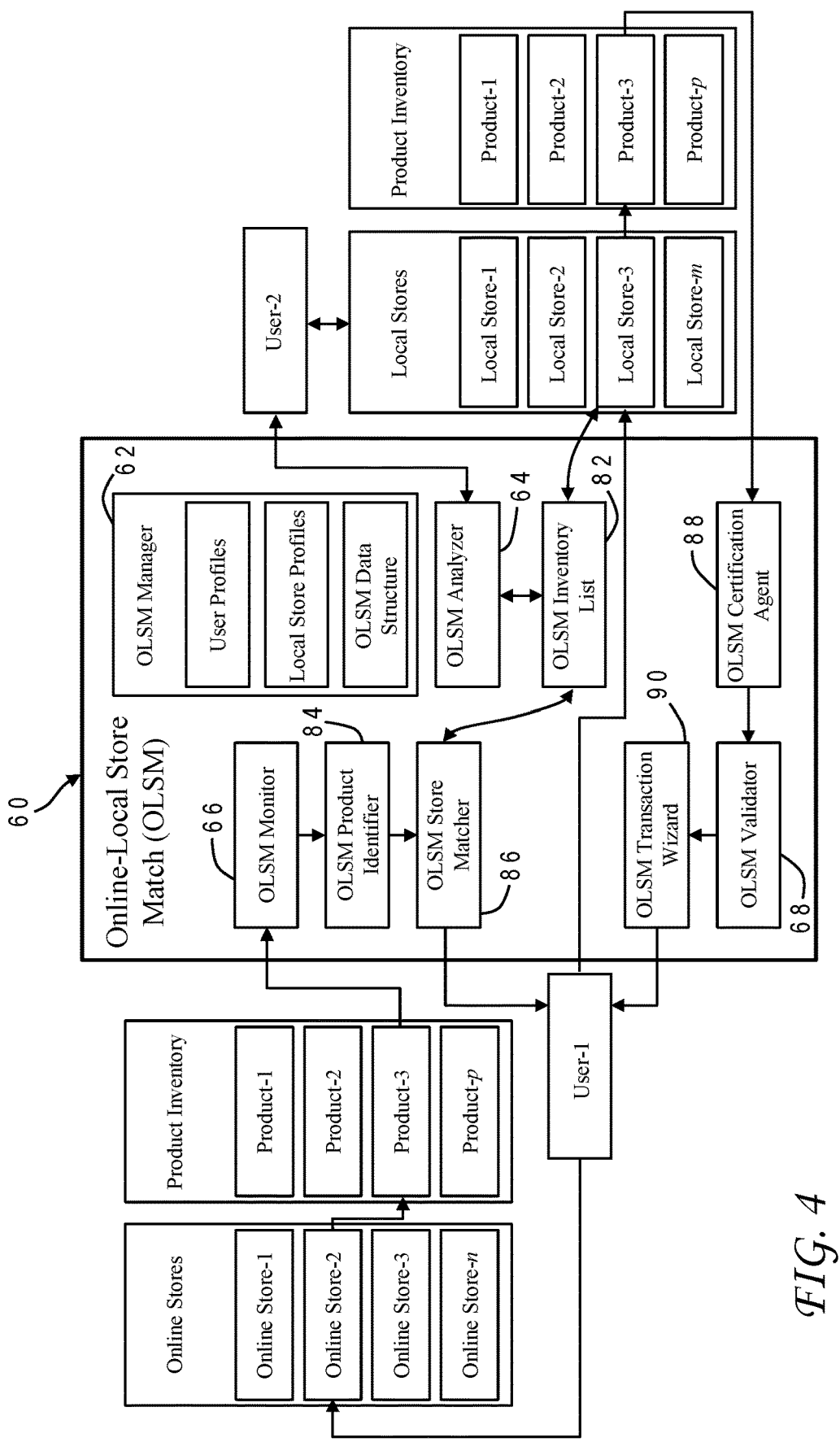
FIG. 4 is a chart illustrating the logical flow for an online-local store matching process in accordance with one implementation of the present invention.

OLSM system 60 can be deployed for use by any number of online stores and local stores. Each of the online stores and local stores can register with OLSM 60 to opt in to the initiative. There is no need for any given local store to make specific arrangements with any given online store. Local retailers can upload their product inventory and stock levels to a secure cloud-based application that is linked to the ecommerce retailers. FIG. 4 shows an exemplary flow for one implementation of system 60. A customer ("User-1") logs in to the e-retailer's online presence ("Online Store-2") to buy a computer tablet ("Product-3"). This activity is noted by OLSM manager 62 which loads appropriate information for this user including their profile, the profiles of any local stores near this user, and the resulting OLSM data structure. It turns out this item is out of stock at the online store, or is otherwise not available according to any particular constraints that apply. For example, the customer may not want to pay any additional shipping charges and can indicate this requirement via a setting in their account with the online store. The online shopping interface displays a button or other input object which informs the customer that the item might be available locally with free pickup. When the customer clicks on this option, the item details are transferred to the cloud analytic server (OLSM Monitor 66) to run a query based on user location, item detail and local retailer stock. This service relies on OLSM analyzer 64 to detect one or many participating local stores near the customer's location. The local stores can upload the information directly to OLSM inventory list 82, or inventory information can be gleaned from monitoring of other customers ("User-2").

In this case, one of the local retailers ("Local Store-3") is found to have the computer tablet (again "Product-3"). This match is relayed to OLSM store matcher 86 which communicates to the e-commerce platform to present it to the customer as a purchase option. Once the customer agrees to this local-pickup purchase option, they proceed through the online store's regular shopping interface to pay for the item. OLSM certification agent 88 takes the product and local store information and generates the digital voucher. The voucher is recorded by OLSM validator 68 (and OLSM transaction wizard 90) for future reference, and presented to the customer. The local store can optionally be informed of the purchase by OLSM validator 68 to allow the product to be reserved for the customer, i.e., taken off the shelf and placed at an in-store pickup area. When the customer proffers the voucher at the local store, the local store scans the voucher and its authenticity is confirmed by OLSM validator 68. The local store can thereupon accept the voucher and let the system know that it has been redeemed. The local store is reimbursed automatically by OLSM transaction wizard 90.

Figure 5A:
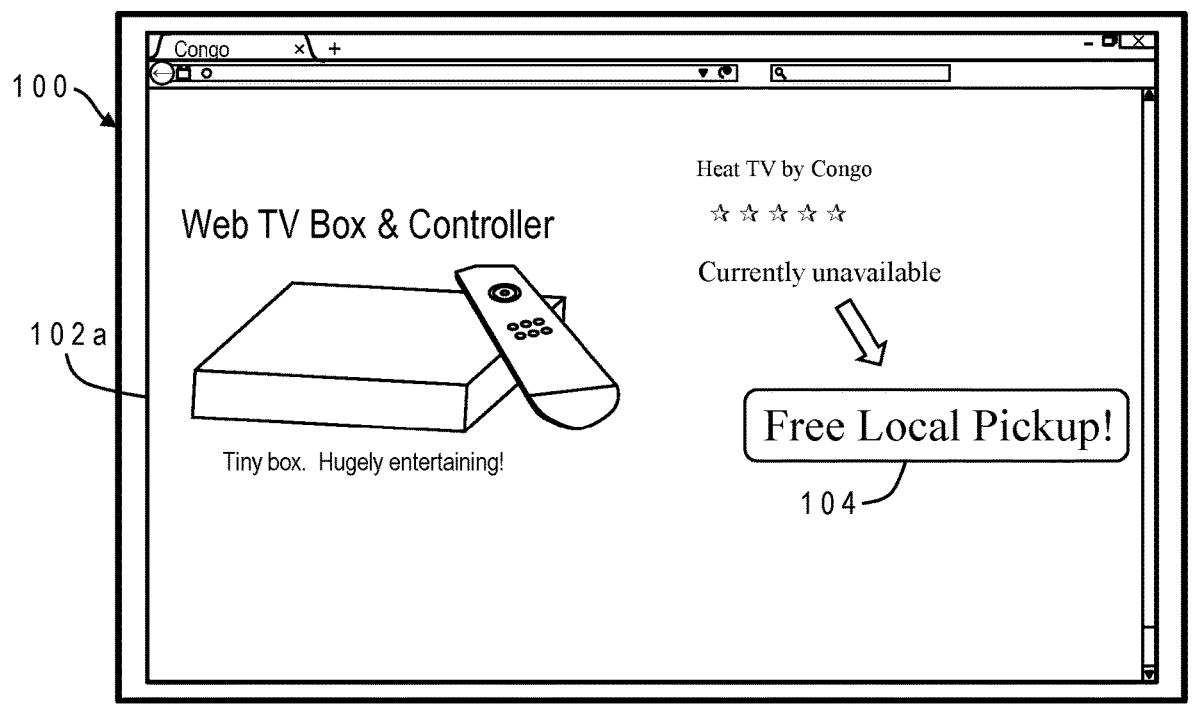
FIGS. 5A and 5B are screenshots from an online store web page showing an item that is currently unavailable but can be picked up at a local physical store by redeeming a voucher in accordance with one implementation of the present invention.
Figure 5B:
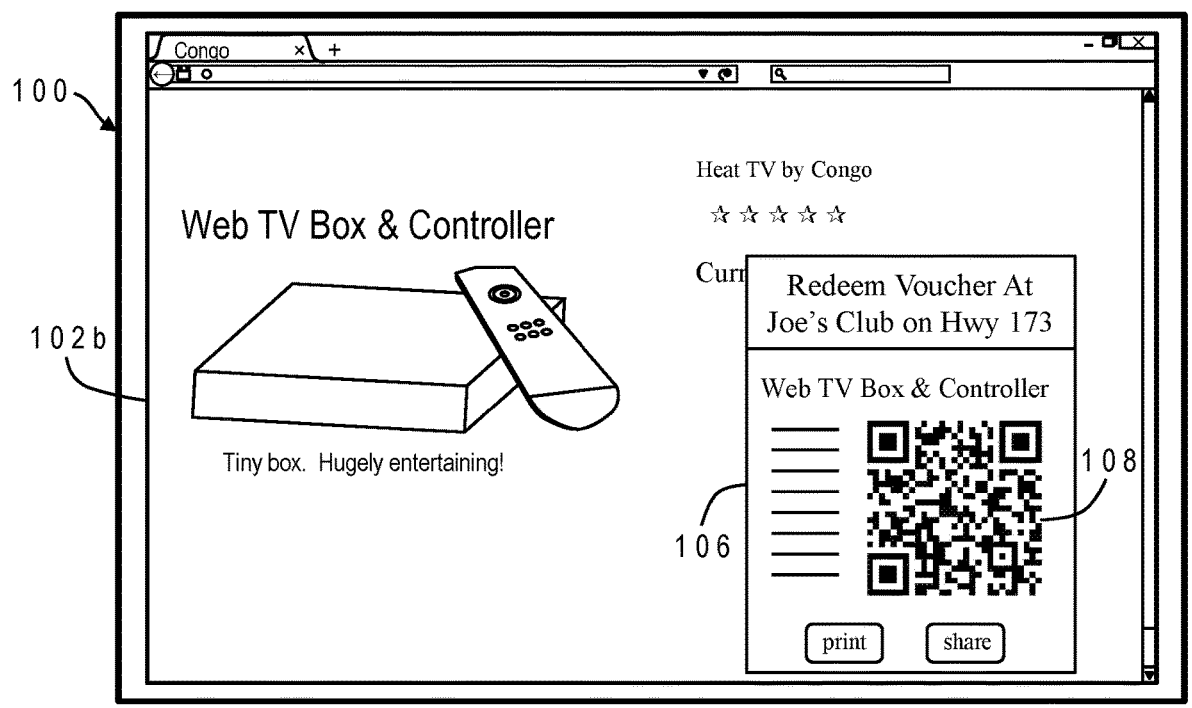

FIGS. 5A and 5B are screenshots from an e-commerce retailer user interface that give a better idea of how the present invention may be deployed for the customer. The screenshots are seen on a display device 100 of the customer's computing device (such as computer system 10) running a web browser or shopping search engine. The customer is interested in buying a "web TV" box with a hand-held controller. FIG. 5A shows a web page 102*a* with details of the product which is normally available at this e-retailer; however, web page 102*a* indicates that the product is currently unavailable, i.e., out of stock. Normally, the customer would be at a dead-end, not able to purchase the product at this time, at least through this online store. However, implementation of the present invention results in a message such as a dialog box or interactive button 104 that indicates the product can be picked up locally for no additional charge. Clicking button 104 will initiate the online-local store match process.

Further to this example, the online-local store match process reveals that a physical store ("Joe's Club") reasonably near the customer's home currently has the product in stock. The customer may be given a choice of several possible local stores to redeem the product. When the customer agrees to this option, a voucher 106 is presented to the customer as seen in the updated web page 102*b* of FIG. 5B. Voucher 106 can have all sorts of written ancillary information such as the product description and directions to the local store. Voucher 106 preferably has redemption information such as a confirmation code or number in both human-readable and machine-readable form. The confirmation code may be any kind of encryption code with authentication and validation features. In the illustrative implementation the redemption code is provided as a quick response (QR) code 108 consisting of black squares arranged in a square grid on a white background. QR codes are generally known and are one of many optical encoding techniques that may be used. Other optical encoding techniques include, without limitation, bar codes, QR code variants such as IQR code, and color encoding such as JAB. The digital version of the voucher can have other interactive objects such as a button to print out the voucher, or a button to share the voucher to another electronic device of the user such as a smartphone. In this manner, the customer can hand the printed voucher to the store associate at the local store or scan the optical code from their smartphone to redeem the voucher and pick up the product.

The present invention thereby offers a superior solution to order fulfillment of online purchases that benefits online stores and local stores as well as consumers. Systems embodying the present invention can avoid the cumbersome details imposed by store memberships or inter-store contractual requirements. Consumers have an enhanced ability to obtain products on demand while retaining the ease of use of online shopping. In some cases consumers can get an item locally at the same price offered by major online retailers. For the online store, this translates to a happy customer experience and thus better customer retention. Online retailers can also benefit via commission-based transaction with minimal efforts, building a network of community-based services. This encourages additional local profile sign-ups that may lead into even more online transactions from the online retailer itself. By becoming a central hub for all transactions, the online store prevents its users from navigating to competitors when an item is out of stock or delivery cost is an issue. For the local store, they can sell products to an audience that might otherwise not be reached using a trusted major retailer's portal, and gain more exposure to a massive online infrastructure without any additional advertising or marketing costs. A local store can sell more of its own products from the increased store traffic, with reduced local transaction and credit commissions. Local stores also benefit from partnerships and gain reputations as affiliates of a major online trusted retailer. This allows local stores to serve the community in case of local emergency when only store online ordering is allowed and physical stores are otherwise closed to the public. The third party management can additionally benefit from the central hub of local store profiles and inventory management. An automated system of partnership with the retailers is created with only access to inventory and basic profiles, that facilitates commission-based transactions. By acting as a trusted facilitator between the major retailer and local stores, the third party management can perform valuable analytics on regional retail sectors and local demands. The third party management likewise benefits from a nationwide trusted retailer's reputation and trusted payment structure while users only have to provide a single user profile.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the present invention has been described in a retail context, it is equally application to other scenarios such as wholesale buying. It is therefore contemplated that such modifications can be made without departing from the spirit or scope of the present invention as defined in the appended claims.

What is claimed is:

1. A method of enhancing online shopping comprising:
monitoring, via a cloud server, purchases of a plurality of users from physical stores;
updating, via the cloud server, a multi-store inventory database based on the monitoring;
receiving, via the cloud server, an inquiry from a user via an online presence of an online store for a product offered by the online store at a first price, the cloud server allowing the online store to be an e-commerce hub;
ascertaining, via the cloud server, that the product is unavailable from the online store;
querying, via the cloud server, the multi-store inventory database to determine that the product is available from at least one particular physical store local to the user at a second price greater than the first price, the particular physical store being separate from the online store, said querying comprising selecting the particular physical store based in part on one or more product matching policies, at least one of the product matching policies being a price difference that is less than a threshold value, the price difference comprising the second price compared to the first price;
making, via the cloud server, an offer of the product at the first price and available at the particular physical store to the user via the online presence of the online store;

receiving, via the cloud server, approval of the offer from the user;

transmitting, via the cloud server, a digital voucher to the user via the online presence of the online store for purchasing the product directly from the particular physical store, wherein the digital voucher comprises directions to the particular physical store, a print button for printing the digital voucher, a share button for sharing the digital voucher with another electronic device, an encryption code selected from a group consisting of an IQR code and a color encoding, and a written description of the product; and in response to the particular physical store scanning the encryption code in exchange for the product and in response to the cloud server authenticating the encryption code, issuing via the cloud server a credit for the first price to the particular physical store, the credit encompassing the online store absorbing the price difference.

2. The method of claim 1 further comprising:

receiving a user profile for the user, the user profile having at least one location associated with the user; and establishing that the particular physical store is local to the user based on a predefined proximity of the particular physical store to the user location.

3. The method of claim 1 further comprising:

maintaining, via an online-local store match manager of the cloud server, user profiles for a plurality of users including the user, store profiles for a plurality of physical stores including the particular physical store, a data structure having a plurality of parameters relating to matching of an online selected product with the physical stores, and the one or more product matching policies, the one or more product matching policies establishing constraints on when the online selected product matches one or more of the physical stores;

maintaining, via an online-local store match analyzer of the cloud server, the multi-store inventory database based on current product availability at the physical stores;

identifying, via an online-local store match monitor of the cloud server, candidate products from the physical stores that match the online selected product; and creating, via an online-local store match validator of the cloud server, a transaction record for the voucher;

wherein the monitoring of the purchases of the plurality of users from the physical stores is performed via the online-local store match monitor;

wherein the digital voucher is generated via the online-local store match validator; and wherein the authenticating of the encryption code is performed via the online-local store match validator.

4. The method of claim 1 wherein said querying determines that the product is available from at least two physical stores local to the user, and the voucher is redeemable at either of the two physical stores.

5. The method of claim 1, further comprising performing, via the cloud server, analytics on regional retail sectors including the physical stores and on local demands including demands of the plurality of users.

6. The method of claim 1, wherein:

the querying determines that the product is available from a first physical store and a second physical store, the first and the second physical stores are both local to the user, the product is available from both the first and the second physical stores at a respective second price greater than the first price, the making the offer of the product further comprises transmitting to the user, via the cloud server, a list comprising the first physical store and the second physical store, and the receiving the approval of the offer further comprises receiving a selection of the first physical store or of the second physical store.

7. The method of claim 1, wherein:

the querying determines that the product is available from a first physical store and a second physical store, wherein the first and the second physical stores are both local to the user, wherein the product is available from both the first and the second physical stores at a respective second price greater than the first price, and wherein the voucher is redeemable at both the first physical store and the second physical store.

8. The method of claim 1, wherein the scanning of the encryption code occurs from the digital voucher.

9. The method of claim 1, wherein the scanning of the encryption code occurs from a second computer after the user actuates the share button on the digital voucher on a first computer, the actuation transmitting a copy of the digital voucher from the first computer to the second computer.

10. The method of claim 1, wherein the scanning of the encryption code occurs from a printed copy of the digital voucher after the user actuates the print button on the digital voucher in order to print the printed copy.

11. A computer system for enhancing online shopping, the computer system comprising:

one or more processors which process program instructions;

a memory connected to said one or more processors, said memory storing program instructions executable by the one or more processors to cause the computer system to:

monitor purchases of a plurality of users from physical stores;

update a multi-store inventory database based on the monitoring;

receive an inquiry from a user via an online presence of an online store for a product offered by the online store at a first price, the cloud server allowing the online store to be an e-commerce hub;

ascertain that the product is unavailable from the online store;

query the multi-store inventory database to determine that the product is available from at least one particular physical store local to the user at a second price greater than the first price, the particular physical store being separate from the online store, said querying comprising selecting the particular physical store based in part on one or more product matching policies, at least one of the product matching policies being a price difference that is less than a threshold value, the price difference comprising the second price compared to the first price;

make an offer of the product at the first price and available at the particular physical store to the user via the online presence of the online store;

receive approval of the offer from the user;

transmit a digital voucher to the user via the online presence of the online store for purchasing the product directly from the particular physical store, wherein the digital voucher comprises directions to the particular physical store, a print button for printing the digital voucher, a share button for sharing the digital voucher with another electronic device, an encryption code selected from a group consisting of an IQR code and a color encoding, and a written description of the product; and in response to the particular physical store scanning the encryption code in exchange for the product and in response to the encryption code being authenticated, issue a credit for the first price to the particular physical store, the credit encompassing the online store absorbing the price difference.

12. The computer system of claim 11 wherein said program instructions are executable by the one or more processors to further cause the computer system to:

receive a user profile for the user having at least one location associated with the user, and establish that the particular physical store is local to the user based on a predefined proximity of the particular physical store to the user location.

13. The computer system of claim 11 wherein a query determines that the first product is available from at least two physical stores local to the user, and the voucher is redeemable at either of the two physical stores.

14. The computer system of claim 11, further comprising:

an online-local store match manager configured to maintain user profiles for a plurality of users including the user, store profiles for a plurality of physical stores including the particular physical store, a data structure having a plurality of parameters relating to matching of an online selected product with the physical stores, and the one or more product matching policies, the one or more product matching policies establishing constraints on when the online selected product matches one or more of the physical stores;

an online-local store match analyzer configured to maintain the multi-store inventory database based on current product availability at the physical stores;

an online-local store match monitor configured to identify candidate products from the physical stores that match the online selected product; and an online-local store match validator configured to create a transaction record for the voucher;

wherein the monitoring of the purchases of the plurality of users from the physical stores is performed via the online-local store match monitor;

wherein the digital voucher is generated via the online-local store match validator; and wherein the authenticating of the encryption code is performed via the online-local store match validator.

15. The computer system of claim 11, wherein said program instructions are executable by the one or more processors to further cause the computer system to perform analytics on regional retail sectors including the physical stores and on local demands including demands of the plurality of users.

16. A computer program product for enhancing online shopping, the computer program product comprising:

one or more computer readable storage media; and program instructions collectively residing in said one or more computer readable storage media, the program instructions being executable by a first computer to cause the first computer to:

monitor purchases of a plurality of users from physical stores, update a multi-store inventory database based on the monitoring, receive an inquiry from a user via an online presence of an online store for a product offered by the online store at a first price, ascertain that the product is unavailable from the online store, query the multi-store inventory database to determine that the product is available from a first physical store and a second physical store local to the user at a second price greater than the first price, wherein the first and the second physical stores are separate from the online store, said query comprising selecting the first and the second physical stores based in part on one or more matching policies, at least one of the one or more product matching policies being a price difference that is less than a threshold value, the price difference comprising the second price compared to the first price, make an offer of the product at the first price and available at the first and the second physical stores to the user via the online presence of the online store the offer including a transmittal of a list comprising a name of the first physical store and a name of the second physical store, receive approval of the offer from the user and a selection from the user of one of the first physical store and the second physical store, transmit a digital voucher to the user via the online presence of the online store for purchasing the product directly from the selected one of the first and the second physical stores, wherein the digital voucher comprises directions to the selected one of the first and the second physical stores, a print button for printing the digital voucher, a share button for sharing the digital voucher with another electronic device, and an encryption code selected from a group consisting of an IQR code and a color encoding, and in response to the selected one of the first and the second physical stores scanning the encryption code from the digital voucher in exchange for the product and in response to the first computer authenticating the encryption code, issue a credit for the first price to the selected one of the first and the second physical stores, the credit encompassing the online store absorbing the price difference.

17. The computer program product of claim 16 wherein said program instructions are executable by the first computer to further cause the first computer:

maintain, via an online-local store match manager, user profiles for a plurality of users including the user, store profiles for a plurality of physical stores including the first and the second physical stores, a data structure having a plurality of parameters relating to matching of an online selected product with the physical stores, and the one or more product matching policies, the one or more product matching policies establishing constraints on when the online selected product matches one or more of the physical stores;

maintain, via an online-local store match analyzer, the multi-store inventory database based on current product availability at the physical stores;

identify, via an online-local store match monitor, candidate products from the physical stores that match the online selected product; and create, via an online-local store match validator, a transaction record for the voucher;

wherein the monitoring of the purchases of the plurality of users from the physical stores is performed via the online-local store match monitor;

wherein the digital voucher is generated via the online-local store match validator; and wherein the authenticating of the encryption code is performed via the online-local store match validator.

18. The computer program product of claim 16, wherein said program instructions are executable by the first computer to further cause the first computer to:

receive a user profile for the user, the user profile having at least one location associated with the user; and establish that the particular physical store is local to the user based on a predefined proximity of the particular physical store to the user location.

19. The computer program product of claim 16, wherein said querying determines that the product is available from at least two physical stores local to the user, and the voucher is redeemable at either of the two physical stores.

20. The computer program product of claim 16, wherein said program instructions are executable by the first computer to further cause the first computer to perform analytics on regional retail sectors including the physical stores and on local demands including demands of the plurality of users.

* * * * *